United States Patent
Tan et al.

(10) Patent No.: US 9,800,749 B1
(45) Date of Patent: Oct. 24, 2017

(54) ARRANGEMENT FOR, AND METHOD OF, EXPEDITIOUSLY ADJUSTING READING PARAMETERS OF AN IMAGING READER BASED ON TARGET DISTANCE

(71) Applicant: SYMBOL TECHNOLOGIES, LLC, Lincolnshire, IL (US)

(72) Inventors: Chinh Tan, Setauket, NY (US); Carl D. Wittenberg, Water Mill, NY (US); Harry E. Kuchenbrod, Kings Park, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/170,464

(22) Filed: Jun. 1, 2016

(51) Int. Cl.
| | |
|---|---|
| *G06K 7/10* | (2006.01) |
| *H04N 1/00* | (2006.01) |
| *H04N 1/028* | (2006.01) |
| *H04N 1/024* | (2006.01) |
| *G06K 9/22* | (2006.01) |

(52) U.S. Cl.
CPC ......... *H04N 1/00816* (2013.01); *G06K 9/228* (2013.01); *H04N 1/02409* (2013.01); *H04N 1/02815* (2013.01)

(58) Field of Classification Search
CPC . G02B 7/021; G06K 7/10801; G06K 7/10811
USPC .................. 235/454, 462.2, 462.23, 462.24
See application file for complete search history.

(56) References Cited

U.S. PATENT DOCUMENTS

| | | | |
|---|---|---|---|
| 6,995,762 B1 | 2/2006 | Pavlidis et al. | |
| 7,021,542 B2 | 4/2006 | Patel et al. | |
| 7,044,377 B2 | 5/2006 | Patel et al. | |
| 7,201,321 B2* | 4/2007 | He ..................... | G06K 7/10722 235/462.05 |
| 8,328,099 B2* | 12/2012 | Thuries ................... | G02B 7/32 235/462.01 |
| 8,864,035 B2* | 10/2014 | Fukuba ................... | G02B 3/14 235/435 |
| 8,925,815 B2* | 1/2015 | Madej .................. | G07G 1/0018 235/383 |
| 9,185,306 B1 | 11/2015 | Tan et al. | |

(Continued)

OTHER PUBLICATIONS

U.S. Appl. No. 15/165,117, filed May 26, 2016, entitled "Arrangement for, and Method of, Determining a Distance to a Target to be Read by Image Capture Over a Range of Working Distances" (25 pages).

(Continued)

*Primary Examiner* — Seung Lee
(74) *Attorney, Agent, or Firm* — Yuri Astvatsaturov

(57) ABSTRACT

A distance to a target to be read by image capture over a range of working distances is determined by directing an aiming light spot along an aiming axis to the target, and by capturing a first image of the target containing the aiming light spot, and by capturing a second image of the target without the aiming light spot. Each image is captured in a frame over a field of view having an imaging axis offset from the aiming axis. An image pre-processor compares first image data from the first image with second image data from the second image over a common fractional region of both frames to obtain a position of the aiming light spot in the first image, and determines the distance to the target based on the position of the aiming light spot in the first image.

16 Claims, 7 Drawing Sheets

(56) References Cited

U.S. PATENT DOCUMENTS

| | | | |
|---|---|---|---|
| 2007/0164115 A1* | 7/2007 | Joseph | G06K 7/10752 |
| | | | 235/462.21 |
| 2009/0206158 A1 | 8/2009 | Thuries et al. | |
| 2010/0147957 A1 | 6/2010 | Gurevich | |
| 2015/0097035 A1* | 4/2015 | Duan | G06K 7/10831 |
| | | | 235/462.21 |

OTHER PUBLICATIONS

International Search Report and Written Opinion for International Patent Application No. PCT/US2017/032138 dated Aug. 3, 2017.

\* cited by examiner

ARRANGEMENT FOR, AND METHOD OF, EXPEDITIOUSLY ADJUSTING READING PARAMETERS OF AN IMAGING READER BASED ON TARGET DISTANCE

BACKGROUND OF THE INVENTION

The present invention relates generally to an arrangement for, and a method of, expeditiously adjusting one or more reading parameters of an imaging reader operative for reading targets by image capture over a range of working distances based on target distance, especially in an imaging reader having an aiming light assembly offset from an imaging assembly.

Solid-state imaging systems or imaging readers have been used, in both handheld and/or hands-free modes of operation, to electro-optically read targets, such as one- and two-dimensional bar code symbol targets, and/or non-symbol targets, such as documents. A handheld imaging reader includes a housing having a handle held by an operator, and an imaging module, also known as a scan engine, supported by the housing and aimed by the operator at a target during reading. The imaging module includes an imaging assembly having a solid-state imager or imaging sensor with an imaging array of photocells or light sensors, which correspond to image elements or pixels in an imaging field of view of the imager, and an imaging lens assembly for capturing return light scattered and/or reflected from the target being imaged, and for projecting the return light onto the array to initiate capture of an image of the target. Such an imager may include a one- or two-dimensional charge coupled device (CCD) or a complementary metal oxide semiconductor (CMOS) device and associated circuits for producing and processing electronic signals corresponding to a one- or two-dimensional array of pixel data over the imaging field of view. In order to increase the amount of the return light captured by the array, for example, in dimly lit environments, the imaging module generally also includes an illuminating light assembly for illuminating the target, preferably with a variable level of illumination light for reflection and scattering from the target. An aiming light assembly may also be supported by the imaging module for projecting a visible aiming light spot on the target.

In some applications, for example, in warehouses, it is sometimes necessary for the same reader to read not only far-out targets, e.g., on products located on high overhead shelves, which are located at a far-out range of working distances on the order of thirty to fifty feet away from the reader, but also close-in targets, e.g., on products located at floor level or close to the operator, which are located at a close-in range of working distances on the order of less than two feet away from the reader. A near imager may be provided in the reader for imaging and focusing on close-in targets over a relatively wider imaging field of view, and a far imager may also be provided in the same reader for imaging and focusing on far-out targets over a relatively narrower imaging field of view. Typically, at least one of the imagers, usually the far imager, has a variable focus, such as a movable lens assembly or a variable focus element.

Although the known imaging reader is generally satisfactory for its intended purpose, it can be challenging for the reader to expeditiously select the correct imager to read a target, to expeditiously select the correct gain and/or exposure for the selected imager, as well as to expeditiously select a correct level of illumination to illuminate the target that can be located anywhere in the extended working distance range. It can also be challenging to focus the correct imager over the extended working distance range. Contrast-based automatic focusing, which is common in consumer cameras on smartphones, is notoriously slow, because it relies on capturing and processing many images over many successive frames over a relatively long time period to determine the best focus position. Such sluggish performance is not acceptable in many industrial applications where a fast-acting, aggressive, and dynamic reader is desired.

Accordingly, there is a need to expeditiously adjust various reading parameters of an imaging reader, such as selecting the correct imager, adjusting the gain and/or exposure of at least one imager, adjusting the illumination level, and focusing the at least one imager, for reading a target that can be located anywhere in an extended working distance range relative to an imaging reader, without slowing or degrading reader performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
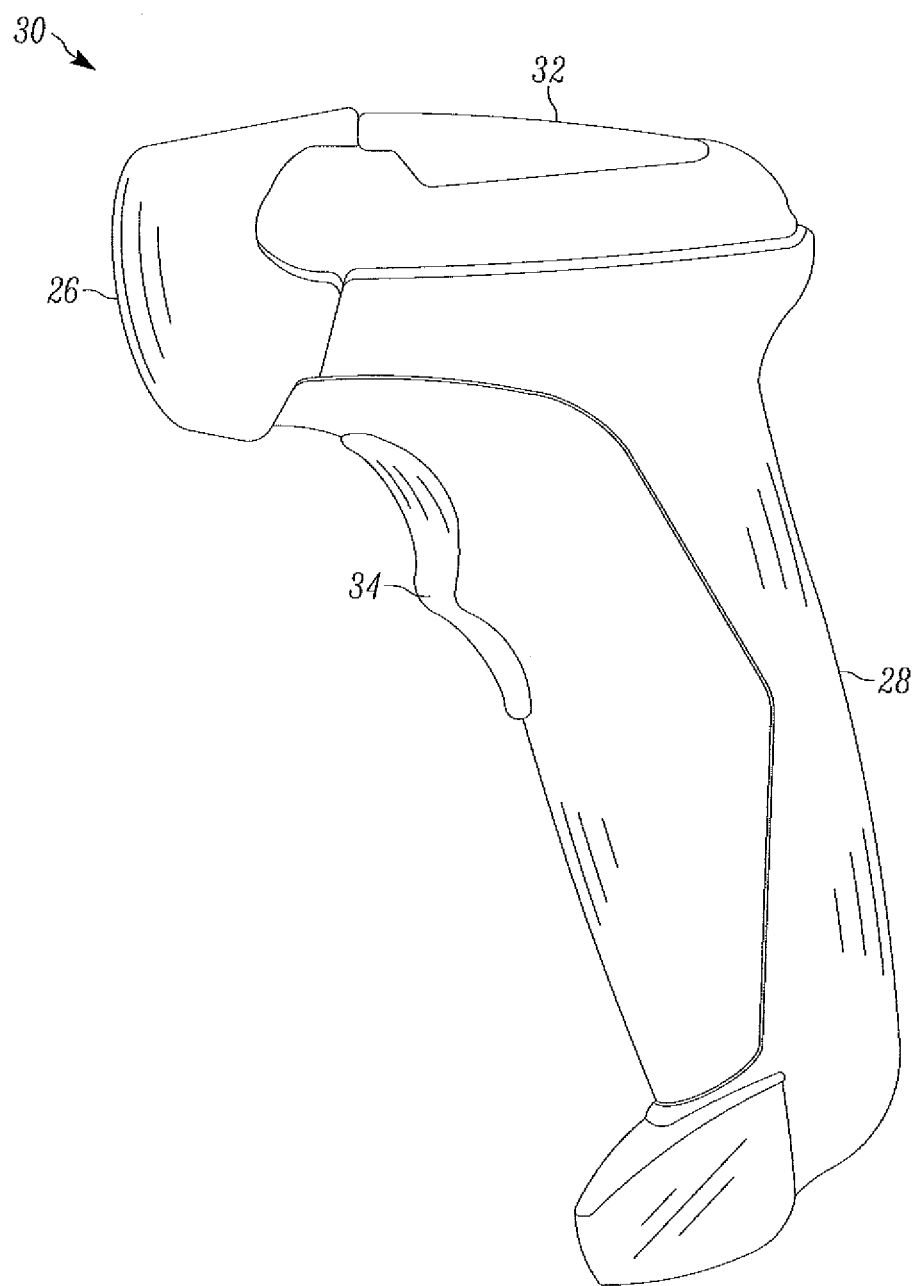
FIG. 1 is a side elevational view of a portable, handheld imaging reader operative for determining a target distance for use in expeditiously selecting the correct imager and/or imager gain and/or imager exposure and/or illumination level, and/or in expeditiously focusing the correct imager, in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an arrangement for adjusting at least one reading parameter of an imaging reader for reading targets by image capture over a range of working distances. The arrangement includes an energizable aiming assembly for directing an aiming light spot along an aiming axis to the target when energized, and a controller for energizing and deenergizing the aiming assembly. The arrangement also includes an imaging assembly for capturing a first image of the target containing the aiming light spot with the aiming assembly energized, and for capturing a second image of the target without the aiming light spot with the aiming assembly deenergized. Each image is captured in a frame over a field of view having an imaging axis offset from the aiming axis. An image pre-processor compares first image data from the first image with second image data from the second image over a common fractional region of both frames to obtain a position of the aiming light spot in the first image, and also determines the distance to the target based on the position of the aiming light spot in the first image. The controller is further operative for adjusting the at least one reading parameter based on the determined target distance.

More particularly, during a coarse determination of the target distance, the image pre-processor subdivides the common fractional region into a plurality of sub-frames, and compares the first and second image data in each sub-frame to obtain the position of the aiming light spot in at least one of the sub-frames. Thereafter, during a fine determination of the target distance, the image pre-processor subdivides an area around the position of the aiming light spot into a plurality of sub-regions, and compares the first and second image data in each sub-region to obtain the position of the aiming light spot in at least one of the sub-regions. Advantageously, the imaging assembly captures each image as an array of pixels having brightness values, and the image pre-processor averages the brightness values in each sub-frame and in each sub-region to obtain an average brightness value, and compares differences between the average brightness values in each sub-frame and each sub-region of the first and second images to obtain the position of the aiming light spot based on the largest difference between the average brightness values in at least one of the sub-frames and sub-regions.

The arrangement is preferably incorporated in an imaging module, also known as a scan engine, mounted in the imaging reader, especially a handheld reader, having a near imager for imaging close-in targets over a relatively wider imaging field of view, and a far imager for imaging far-out targets over a relatively narrower imaging field of view. The aforementioned imaging assembly preferably includes the far imager, which has a variable focus, such as a movable lens assembly or a variable focus element. The reader also preferably has an illuminating light assembly for generating a variable level of illumination light.

In accordance with this disclosure, the determined target distance can be used for adjusting one or more reading parameters of the imaging reader. For example, the determined target distance can be employed to automatically select which of the imagers are to be used to image the target, and/or to automatically adjust the gain of the selected imager, and/or to automatically adjust the exposure of the selected imager, and/or to automatically adjust the illumination light level, and/or to automatically adjust the focus of the selected imager. In contrast to the known contrast-based automatic focusing performed by capturing and processing many images over a lengthy time period, the focusing disclosed herein is more expeditious, because the determination of the target distance is performed in sub-frames of a pair of partial images, as well as in sub-regions of the sub-frames.

Still another aspect of the present disclosure relates to a method of adjusting at least one reading parameter of an imaging reader for reading targets by image capture over a range of working distances. The method is performed by directing an aiming light spot along an aiming axis to the target, and by subsequently not directing the aiming light spot to the target. The method is further performed by capturing a first image of the target containing the aiming light spot, capturing a second image of the target without the aiming light spot, and capturing each image in a frame over a field of view having an imaging axis offset from the aiming axis. The method is still further performed by comparing first image data from the first image with second image data from the second image over a common fractional region of both frames to obtain a position of the aiming light spot in the first image, and by determining the distance to the target based on the position of the aiming light spot in the first image. The method is yet further performed by adjusting the at least one reading parameter based on the determined target distance.

Reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A light-transmissive window 26 is located adjacent the front or nose of the body 32 and is preferably also tilted at an angle of inclination, for example, fifteen degrees, relative to the vertical. The imaging reader 30 is held in an operator's hand and used in a handheld mode in which a trigger 34 is manually depressed to initiate imaging of targets, especially bar code symbols, to be read in an extended range of working distances, for example, on the order of thirty to fifty feet, away from the window 26. Housings of other configurations, as well as readers operated in the hands-free mode, could also be employed.

Figure 2:
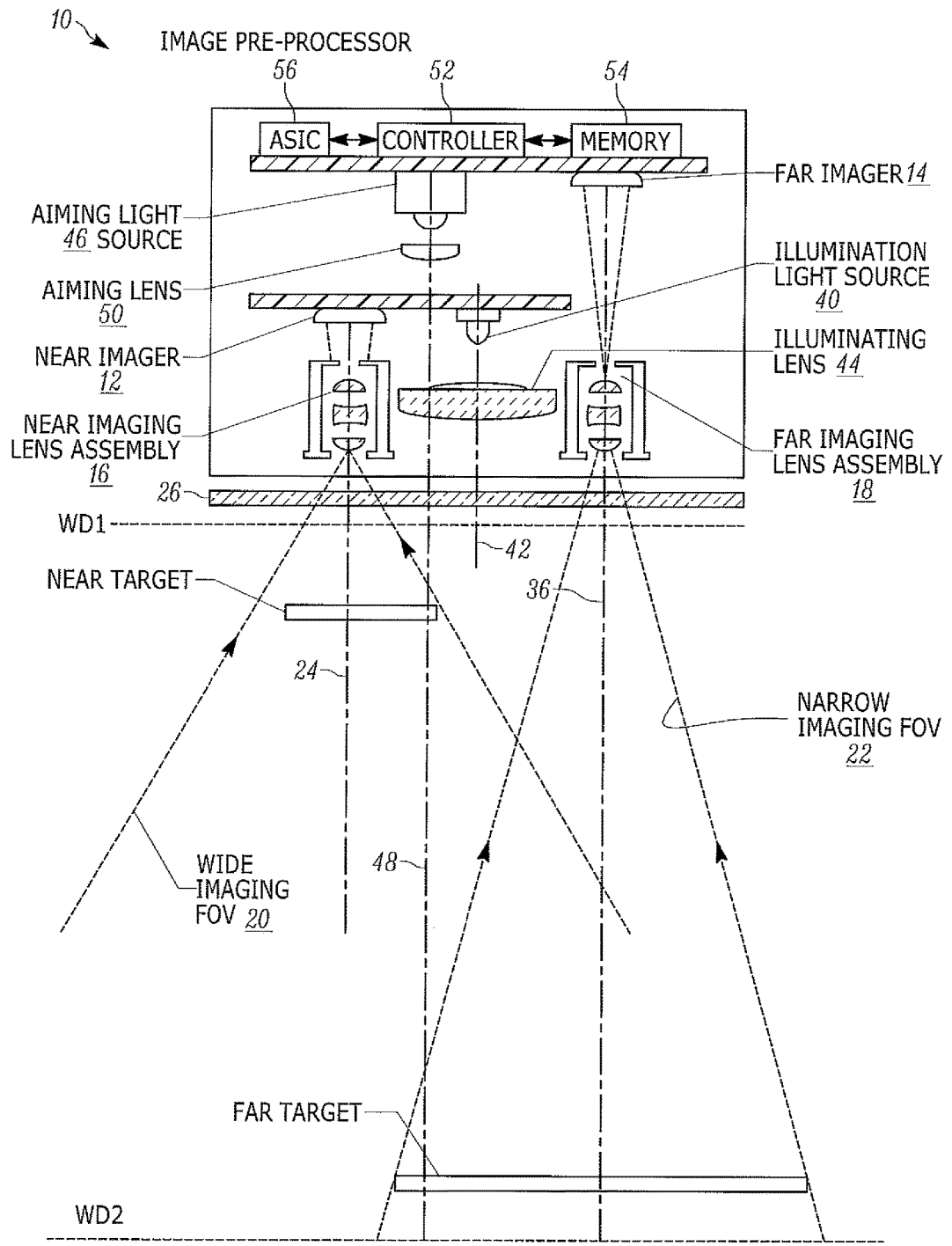
FIG. 2 is a schematic diagram of various components, including imaging, illuminating, and aiming light assemblies supported on an imaging module that is mounted inside the reader of FIG. 1.

As schematically shown in FIG. 2, and as more realistically shown in FIGS. 3-4, an imaging module 10 is mounted in the reader 30 behind the window 26 and is operative, as described below, for reading targets by image capture through the window 26 over an extended range of working distances away from the module 10. A target may be located anywhere in a working range of distances between a close-in working distance (WD1) and a far-out working distance (WD2). In a preferred embodiment, WD1 is either at, or about eighteen inches away, from the window 26, and WD2 is much further away, for example, over about sixty inches away from the window 26. The module 10 includes an imaging assembly that has a near imaging sensor or imager 12, and a near imaging lens assembly 16 for capturing return light over a generally rectangular, relatively wide imaging field of view 20, e.g., about thirty degrees, from a near target located in a close-in region of the range, e.g., from about zero inches to about eighteen inches away from the window 26, and for projecting the captured return light onto the near imager 12, as well as a far imaging sensor or imager 14, and a far imaging lens assembly 18 for capturing return light over a generally rectangular, relatively narrow imaging field of view 22, e.g., about sixteen degrees, from a far target located in a far-out region of the range, e.g., greater than about sixty inches away from the window 26, and for projecting the captured return light onto the far imager 14. Although only two imagers 12, 14 and two imaging lens assemblies 16, 18 have been illustrated in FIG. 2, it will be understood that more than two could be provided in the module 10.

Each imager 12, 14 is a solid-state device, for example, a CCD or a CMOS imager having a one-dimensional array of addressable image sensors or pixels arranged in a single, linear row, or preferably a two-dimensional array of such sensors arranged in mutually orthogonal rows and columns, and operative for detecting return light captured by the respective imaging lens assemblies 16, 18 along respective near and far imaging axes 24, 36 through the window 26. Each imaging lens assembly is advantageously a Cooke triplet. As illustrated in FIG. 4, the near imaging lens assembly 16 has a fixed focus, and the far imaging lens assembly 18 has a variable focus due to the addition of a variable focus element 38 or a movable lens assembly.

Figure 3:
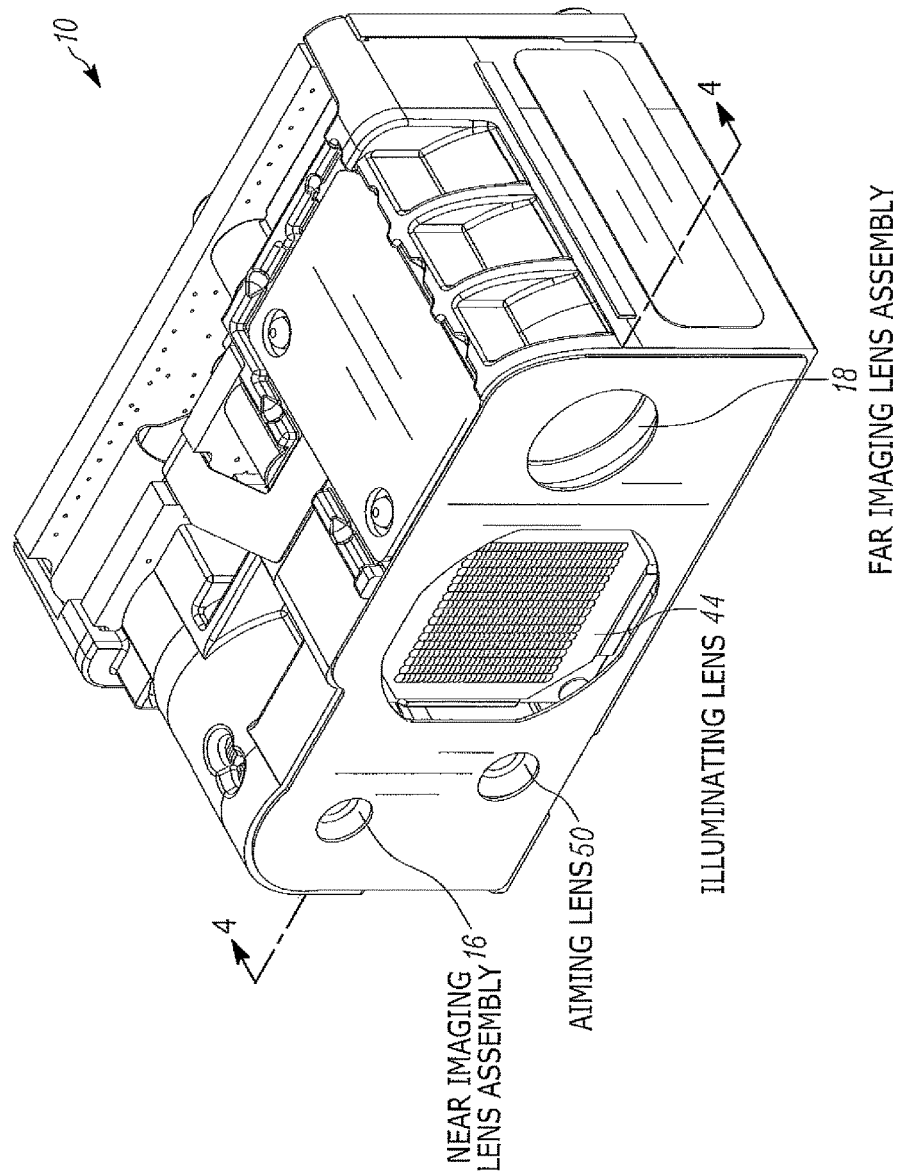
FIG. 3 is a perspective view of the imaging module of FIG. 2 in isolation.
Figure 4:
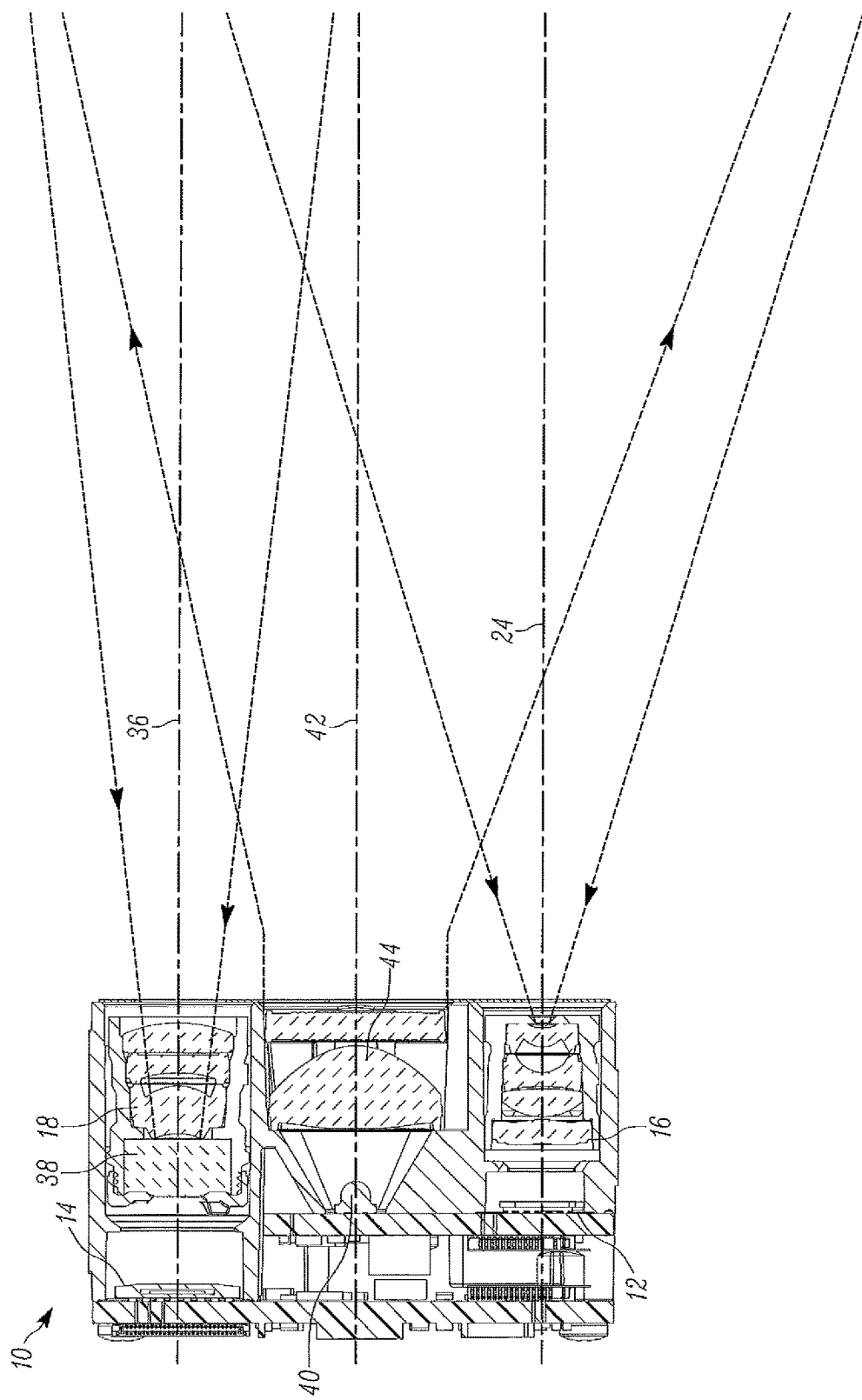
FIG. 4 is a sectional view taken on line 4-4 of FIG. 2.

As also shown in FIGS. 2-4, an illuminating light assembly is also supported by the imaging module 10 and includes an illumination light source, e.g., at least one light emitting diode (LED) 40, stationarily mounted on an optical axis 42, and an illuminating lens assembly that includes an illuminating lens 44 also centered on the optical axis 42. The illuminating light assembly is shared by both imagers 12, 14 and is operative for emitting illumination light at a variable illumination level.

Figure 5:
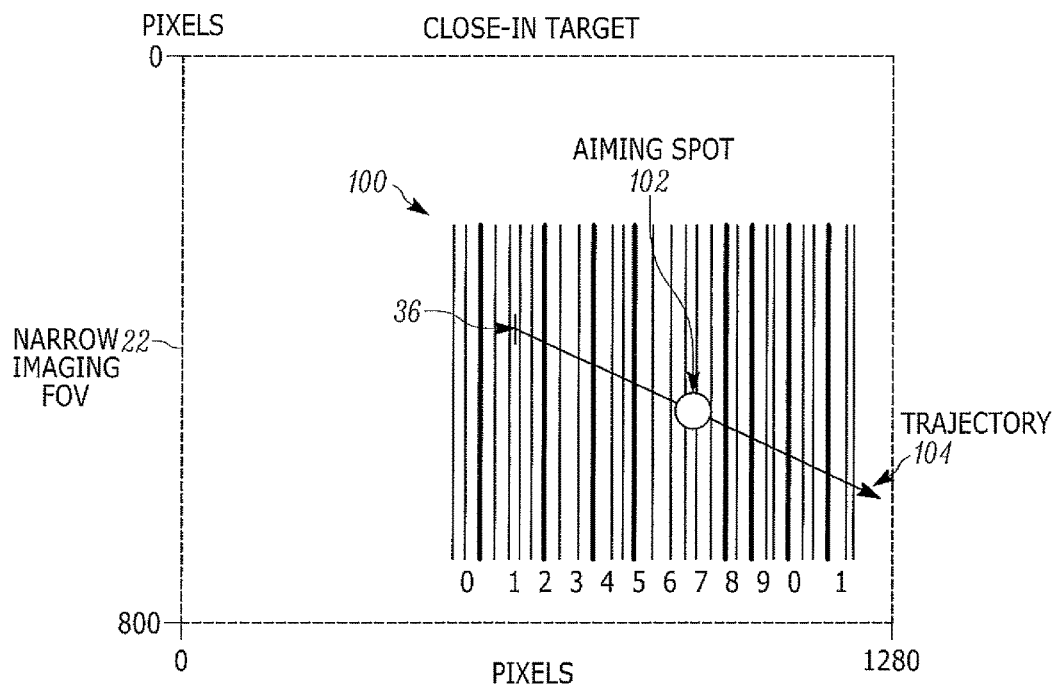
FIG. 5 is a view depicting an aiming spot on a close-in target for the reader of FIG. 1.
Figure 6:
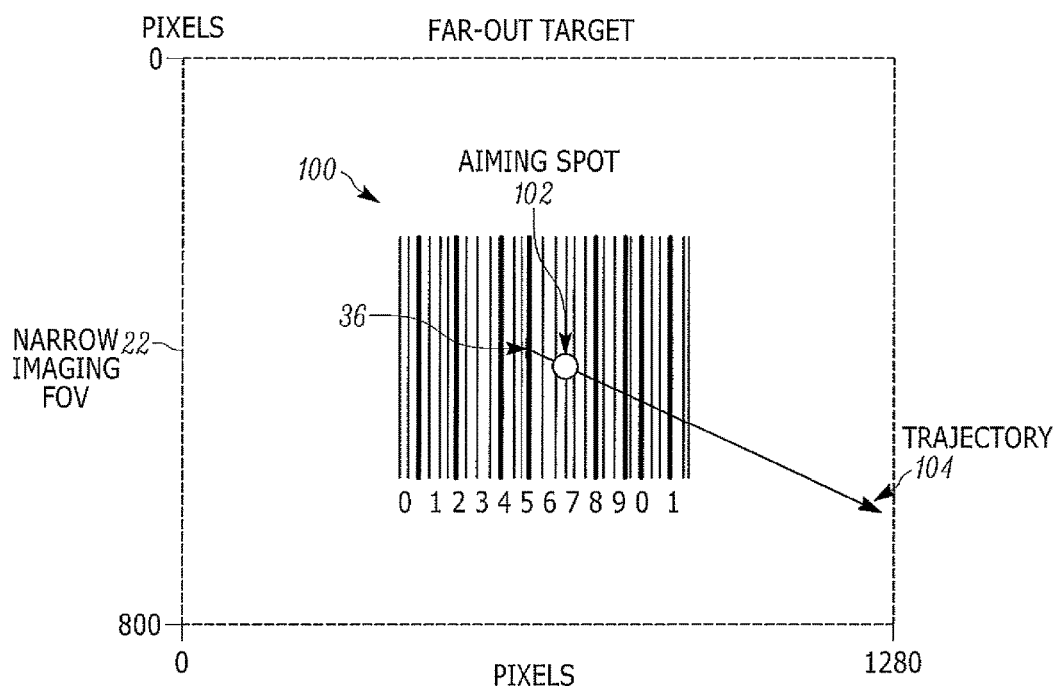
FIG. 6 is a view depicting an aiming spot on a far-out target for the reader of FIG. 1.

As further shown in FIGS. 2-3, an aiming light assembly is also supported by the imaging module 10 and includes an aiming light source 46, e.g., a laser, stationarily mounted on an aiming axis 48, and an aiming lens 50 centered on the aiming axis 48. The aiming lens 50 may include a diffractive or a refractive optical element, and is operative for projecting a visible aiming light pattern along the aiming axis 48 on the target prior to reading. The aiming light pattern includes, as shown in FIGS. 5-6, an aiming light spot 102, preferably of generally circular shape.

As further shown in FIG. 2, the imagers 12, 14, the LED 40 and the laser 46 are operatively connected to a controller or programmed microprocessor 52 operative for controlling the operation of these components. A memory 54 is connected and accessible to the controller 52. Preferably, the controller 52 is the same as the one used for processing the return light from the targets and for decoding the captured target images. An image pre-processor 56 in a custom application-specific integrated circuit (ASIC) or a field-programmable gate array (FPGA), is operatively connected between the imagers 12, 14 and the controller 52 for pre-processing the images captured by the imagers 12, 14, as described more fully below. The image pre-processor 56 may, in some applications, be integrated with the controller 52.

As described above, it can be challenging for the reader 30 to expeditiously select the correct imager 12 or 14 to read a target, to expeditiously select the correct gain and/or exposure for the selected imager, as well as to select a correct level of illumination from the LED 40 to illuminate the target that can be located anywhere in the extended working distance range. It can also be challenging to focus the selected imager over the extended working distance range. Contrast-based automatic focusing, which relies on capturing and processing many images over many successive frames over a relatively long time period to determine the best focus position, is notoriously slow. One aspect of this disclosure is directed to enhancing reader performance by operating the aiming light assembly as both a light meter and as a rangefinder to determine a distance to the target, and then selecting the correct imager 12 or 14, and/or selecting the correct gain and/or exposure for the selected imager, and/or selecting the correct illumination from the LED 40, and/or focusing the selected imager based on the determined distance.

As shown in FIG. 2, the aiming axis 48 is offset from the near and far imaging axes 24, 36 so that the resulting parallax between the aiming spot 102 on the aiming axis 48 and one of the near and far imaging axes 24, 36 provides target distance information. More particularly, the parallax between the aiming axis 48 and either one of the near and far imaging axes 24, 36 provides range information from the pixel position of the aiming spot 102 on one of the imaging sensor arrays. It is preferred to use the imaging axis 36 of the far imager 14 by default, because the parallax error will be greater for the far imager 14 than for the near imager 12. In a preferred embodiment, the distance between the aiming axis 48 and the far imaging axis 36 on the module 10 is about 23 millimeters.

As shown in FIG. 5, a target configured as a symbol 100 located in a close-in region of the range is contained in the narrow field of view 22 of the far imager 14, and preferably the imaging axis 36 is approximately centered in the narrow field of view 22. As shown in FIG. 6, the same symbol 100 located in a far-out region of the range is also contained in the narrow field of view 22 of the far imager 14, and preferably the imaging axis 36 is again approximately centered in the narrow field of view 22. The apparent size of the symbol 100 is greater in FIG. 5 than in FIG. 6. The symbol 100 is off-center in FIG. 5, and is more centered in FIG. 6, in the narrow imaging field of view 22. For the default far imager 14, if the symbol 100 were located at an infinite working distance from the reader 30, then the aiming spot 102 directed onto the symbol 100 would directly overlie the imaging axis 36. As the symbol 100 gets closer and closer to the reader 30, the aiming spot 102 grows larger and larger in area, as shown in FIG. 5, and moves away from the imaging axis 36 along an inclined trajectory 104. By determining the position of the aiming spot 102 relative to the imaging axis 36 on the trajectory 104, the working distance of the symbol 100 can be determined. The spacing between the aiming spot 102 and the imaging axis 36 is proportional to the reciprocal of the working distance. Preferably, the position of the aiming spot 102 along the trajectory 104 is calibrated in advance during reader manufacture. As also shown in FIGS. 5-6, the far imager 14 captures images of the symbol 100 at a certain resolution, in this illustrated case, a two-dimensional resolution of 800 rows of pixels in height by 1280 columns of pixels in width.

The aforementioned image pre-processor 56 is used to analyze the images captured by the far imager 14 in order to determine the position of the aiming spot 102. To minimize cost, the image pre-processor 56 is preferably incorporated in a low power, low processing device, preferably without a frame buffer to store images. As a result, as explained below, the image pre-processor 56 is not tasked with analyzing each entire captured image, but instead, only analyzes a fractional region of each captured image, especially the fractional region in which the aiming spot 102 is expected to appear along the trajectory 104.

Figure 7:
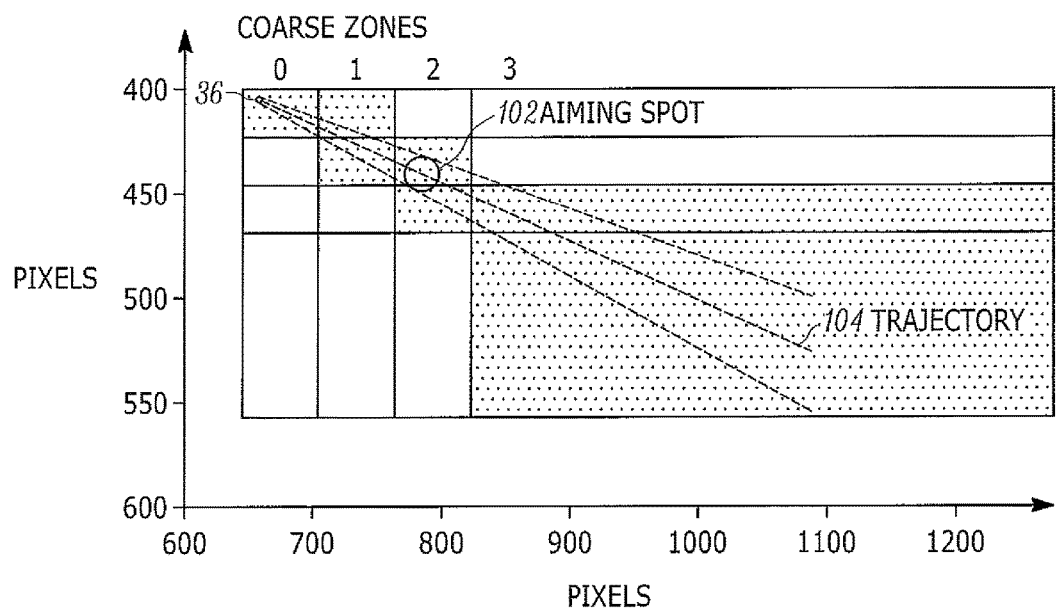
FIG. 7 is a view of an image containing the aiming spot during a coarse determination of the position of the aiming spot in the image.

More particularly, the controller 52 energizes the aiming laser 46 to direct the aiming spot 102 on the symbol 100. The far imager 14 captures a first, entire or preferably partial, image of the symbol 100 with the aiming spot 102 thereon in a first frame. In response, the image pre-processor 56 only analyzes a fractional region of the first image in the first frame. As shown in FIG. 7, the image pre-processor 56 does not analyze the pixels in row 0 to about row 400, or the pixels in about row 560 to row 800, or the pixels in column 0 to about column 640, because the aiming spot 102 is not expected to be there, and there is no reason to waste processing power or time in analyzing pixels where the aiming spot 102 will not be present. The fractional region or remaining area contains only about 160 rows of the original 800 rows of the full first image, and can thus be captured and analyzed much faster than the full first image.

The image pre-processor 56 subdivides the remaining area of the first frame into a matrix of sub-frames or coarse zones. As shown in FIG. 7, the remaining area is subdivided into sixteen, generally rectangular sub-frames, e.g., four rows by four columns. The sub-frames need not be of equal height, or width, or area. It will be understood that the remaining area could be subdivided into any number of sub-frames. The number of the sub-frames is dependent on the precision desired in initially coarsely locating the aiming spot 102 in the sub-frames.

The image pre-processor 56 next acquires image data from each of the sub-frames. More particularly, the tonal or brightness values of all the pixels in each sub-frame are averaged to obtain an average brightness value. The image pre-processor 56 obtains a matrix of sixteen average brightness values, one for each sub-frame.

Thereupon, the controller 52 deenergizes the aiming laser 46, and the far imager 14 captures a second, entire or preferably partial, image of the symbol 100 without the aiming spot 102 thereon in a second frame. As before, the image pre-processor 56 only analyzes a fractional region of the second image in the second frame, and it is the same fractional region as was used in the first image. As before, the image pre-processor 56 acquires brightness values of all the pixels in each sub-frame of the same fractional region, averages the brightness values in each sub-frame of the same fractional region to obtain average brightness values, and obtains a matrix of sixteen average brightness values, one for each sub-frame.

By way of a non-limiting numerical example, the matrix of the sixteen average brightness values with the aiming assembly deenergized is shown below on the left, and the matrix of the sixteen average brightness values with the aiming assembly energized is shown below on the right:

$$\text{Aim\_Off} = \begin{pmatrix} 7.729 & 10.501 & 5.965 & 21.158 \\ 7.214 & 7.715 & 5.841 & 20.854 \\ 5.740 & 8.623 & 6.118 & 16.340 \\ 11.012 & 7.696 & 4.729 & 6.908 \end{pmatrix}$$

$$\text{Aim\_On} = \begin{pmatrix} 8.482 & 10.672 & 5.939 & 21.283 \\ 7.400 & 7.693 & 5.847 & 20.791 \\ 5.758 & 8.602 & 6.092 & 16.263 \\ 11.010 & 7.587 & 4.638 & 6.814 \end{pmatrix}$$

The image pre-processor 56 next compares the two matrices by subtracting the average brightness value for each sub-frame, thereby obtaining, in this numerical example, the following difference matrix of brightness difference values:

$$\text{Aim\_On} - \text{Aim\_Off} = \begin{pmatrix} 0.754 & 0.171 & -0.026 & 0.125 \\ 0.186 & -0.022 & 0.006 & -0.063 \\ 0.017 & -0.021 & -0.026 & -0.077 \\ -0.002 & -0.109 & -0.091 & -0.094 \end{pmatrix}$$

It will be observed from the difference matrix that the brightness difference value in row 1, column 1, stands out from all the others, in that it has the greatest magnitude or difference in brightness. This identifies the location of the aiming spot 102.

Figure 8:
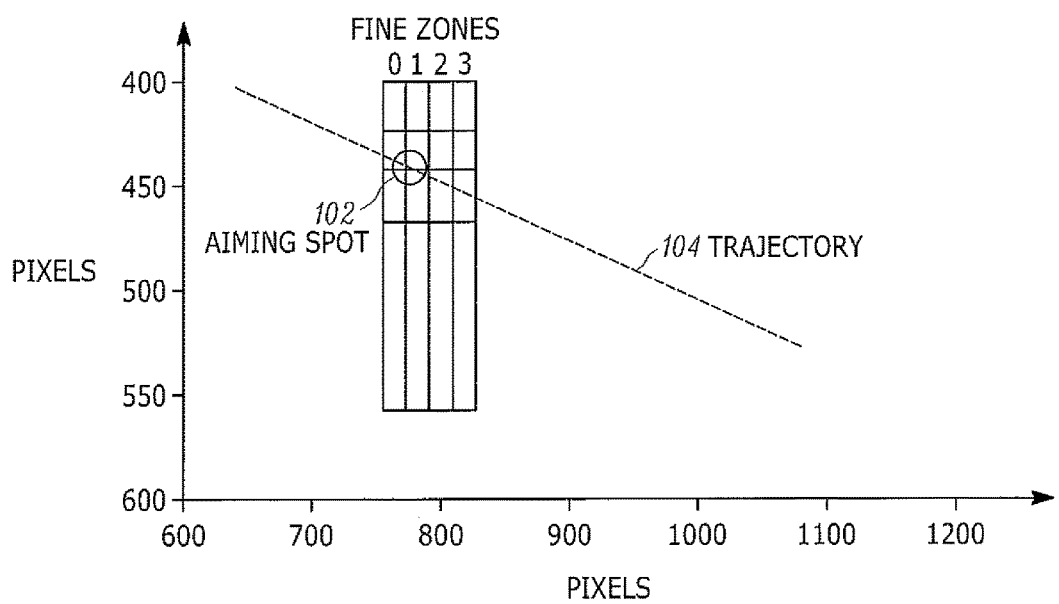
FIG. 8 is a view of an image containing the aiming spot during a fine determination of the position of the aiming spot in the image.

If more precision in determining the location of the aiming spot 102 is desired, then the image pre-processor 56 can subdivide an area around the identified location of the aiming spot 102 into a plurality of sub-regions. As shown in FIG. 8, the image pre-processor 56 subdivides this area into a matrix of sub-regions or fine zones, for example, into sixteen, generally rectangular sub-regions, e.g., four rows by four columns. The sub-regions need not be of equal height, or width, or area. It will be understood that this area could be subdivided into any number of sub-regions. The number of the sub-regions is dependent on the precision desired in subsequently finely locating the aiming spot 102 in the sub-regions.

As before, the controller 52 energizes and deenergizes the aiming laser 46, and the processor 56 obtains a matrix of sixteen average brightness values, one for each sub-region with the aiming laser 46 energized, and another matrix of sixteen average brightness values, one for each sub-region with the aiming laser 46 deenergized. The image pre-processor 56 next compares the two matrices by subtracting the average brightness value for each sub-region, and finely locates the aiming spot 102 by finding the largest brightness difference value in at least one of the sub-regions.

Returning to FIG. 7, it will be observed that not all sixteen sub-frames need to be analyzed, since the aiming spot 102 will only appear in the shaded sub-frames that lie along the trajectory 104. This reduces the possibility of errors resulting from moving objects or flashing light sources that might appear only in the image with the aiming laser 46 energized, and be mistaken for the aiming spot 102. The same principle of ignoring sub-frames can be applied to the top and bottom rows of the sub-regions shown in FIG. 8.

In operation, once the working distance to the symbol 100 is determined from the aiming spot position, the controller 52 either selects the near imager 12, and energizes the illuminating light assembly to illuminate the symbol 100 with illumination light of a relatively lesser intensity when the rangefinder determines that the symbol 100 to be imaged and read by the near imager 12 is located in a close-in region of the range; or selects the far imager 14, and energizes the illuminating light assembly to illuminate the target with illumination light of a relatively greater intensity when the rangefinder determines that the symbol 100 to be imaged and read by the far imager 14 is located in a far-out region of the range.

In addition, once the working distance to the symbol 100 is determined from the aiming spot position, the controller 52 can also adjust the focusing of the far imager 14, such as by changing the focus of the focusing element 38. The controller 52 energizes the LED 40 with a variable electrical current to vary the intensity of the illumination light. Still further, once the working distance to the symbol 100 is determined from the aiming spot position and/or once the brightness values from each sub-frame are determined, the controller 52 can also adjust the gain and/or exposure of one or more imagers.

Figure 9:
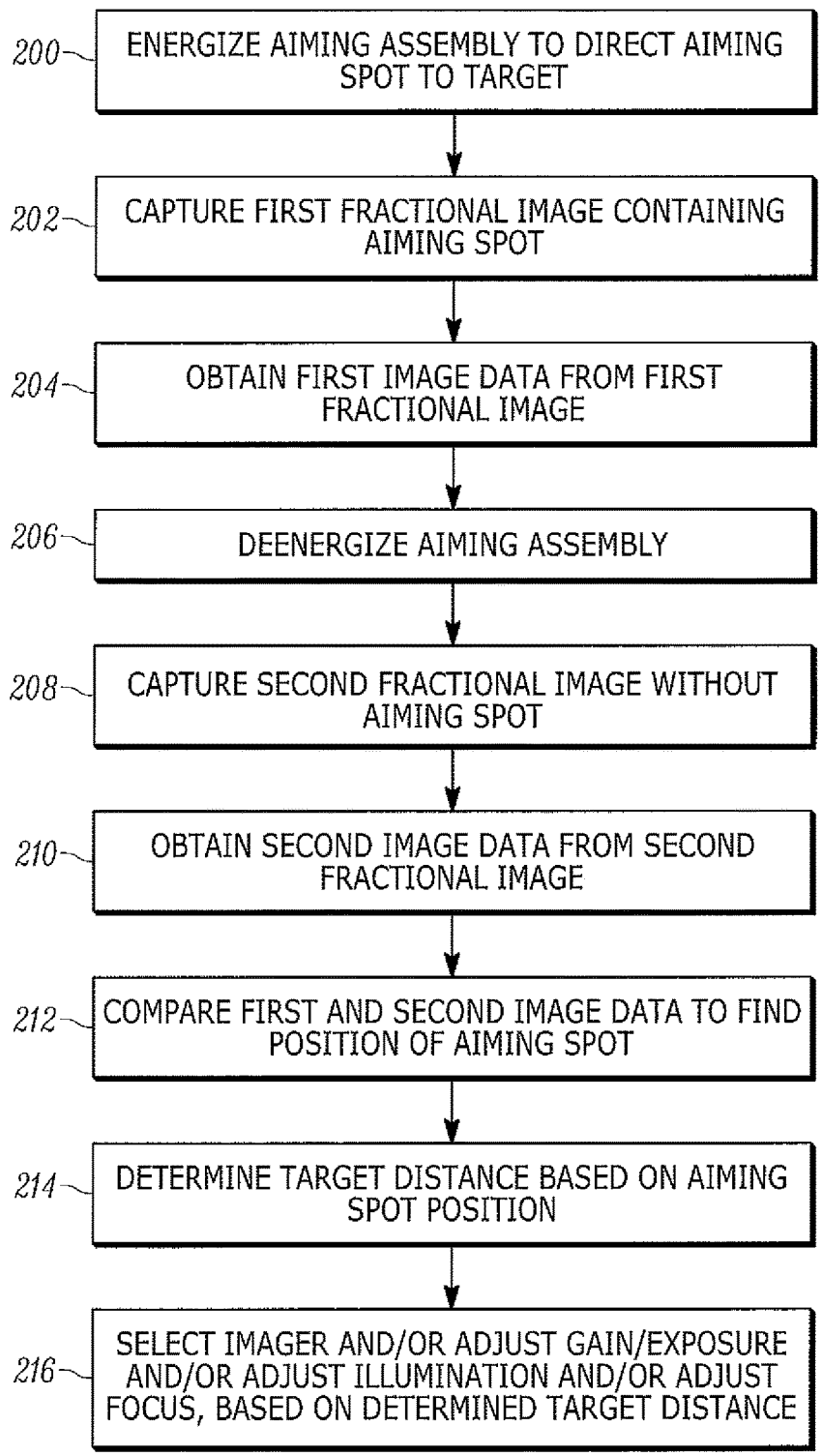
FIG. 9 is a flow chart depicting steps performed in a method of determining the target distance in accordance with this disclosure.

As shown in the flow chart of FIG. 9, the method is performed in step 200 by energizing the aiming light assembly to direct the aiming light spot 102 along an aiming axis to the symbol 100, by capturing a first fractional mage of the symbol 100 containing the aiming light spot 102 in step 202, and by obtaining first image data from the first fractional image in step 204. Next, the aiming light assembly is deenergized in step 206, a second fractional image of the symbol 100 without the aiming light spot 102 is captured in step 208, and second image data from the second fractional image is obtained in step 210. The first and second image data is compared to obtain a position of the aiming light spot 102 in step 212, and the distance to the symbol 100 is determined based on the position of the aiming light spot 102 in step 214. In step 216, the correct imager 12 or 14 is selected, and/or the correct gain and/or exposure for the selected imager is adjusted, and/or the correct illumination from the LED 40 is adjusted, and/or the focus of the selected imager is adjusted, based on the determined distance.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for adjusting at least one reading parameter of an imaging reader for reading targets by image capture over a range of working distances, the arrangement comprising:

an energizable aiming assembly for directing an aiming light spot along an aiming axis to the target when energized;

a controller for energizing and deenergizing the aiming assembly;

an imaging assembly for capturing a first image of the target containing the aiming light spot with the aiming assembly energized, and for capturing a second image of the target without the aiming light spot with the aiming assembly deenergized, each image being captured in a frame over a field of view having an imaging axis offset from the aiming axis;

an image pre-processor for comparing first image data from the first image with second image data from the second image over a common fractional region of both frames to obtain a position of the aiming light spot in the first image, and for determining a distance to the target based on the position of the aiming light spot in the first image; and the controller being further operative for adjusting the at least one reading parameter of the imaging reader based on the determined target distance.

2. The arrangement of claim 1, wherein the image pre-processor subdivides the common fractional region into a plurality of sub-frames, and compares the first and second image data in each sub-frame to obtain the position of the aiming light spot in at least one of the sub-frames.

3. The arrangement of claim 2, wherein the image pre-processor subdivides an area around the position of the aiming light spot into a plurality of sub-regions, and compares the first and second image data in each sub-region to obtain the position of the aiming light spot in at least one of the sub-regions.

4. The arrangement of claim 2, wherein the imaging assembly captures each image as an array of pixels having brightness values, and wherein the image pre-processor is operative for averaging the brightness values in each sub-frame to obtain an average brightness value, and for comparing differences between the average brightness values in each sub-frame of the first and second images to obtain the position of the aiming light spot based on the largest difference between the average brightness values in at least one of the sub-frames.

5. The arrangement of claim 1, wherein the aiming and imaging assemblies and the image pre-processor are incorporated in an imaging module having a near imager for imaging close-in targets over a relatively wider imaging field of view, and a far imager for imaging far-out targets over a relatively narrower imaging field of view, and wherein the imaging assembly is the far imager having a variable focus.

6. The arrangement of claim 5, wherein the controller adjusts a focus of the far imager based on the determined target distance.

7. The arrangement of claim 5, wherein the controller selects one of the imagers, and adjusts at least one of a gain and an exposure for the selected imager, based on the determined target distance.

8. The arrangement of claim 5, and an illuminating light assembly mounted on the module for generating a variable level of illumination light, and wherein the controller adjusts the level of the illumination light based on the determined target distance.

9. A method of adjusting at least one reading parameter of an imaging reader for reading targets by image capture over a range of working distances, the method comprising:

directing an aiming light spot along an aiming axis to the target;

subsequently not directing the aiming light spot to the target;

capturing a first image of the target containing the aiming light spot;

capturing a second image of the target without the aiming light spot;

capturing each image in a frame over a field of view having an imaging axis offset from the aiming axis;

comparing first image data from the first image with second image data from the second image over a common fractional region of both frames to obtain a position of the aiming light spot in the first image;

determining the distance to the target based on the position of the aiming light spot in the first image; and adjusting the at least one reading parameter of the imaging reader based on the determined target distance.

10. The method of claim 9, and subdividing the common fractional region into a plurality of sub-frames, and comparing the first and second image data in each sub-frame to obtain the position of the aiming light spot in at least one of the sub-frames.

11. The method of claim 10, and subdividing an area around the position of the aiming light spot into a plurality of sub-regions, and comparing the first and second image data in each sub-region to obtain the position of the aiming light spot in at least one of the sub-regions.

12. The method of claim 10, wherein the capturing is performed by capturing each image as an array of pixels having brightness values, and averaging the brightness values in each sub-frame to obtain an average brightness value, and comparing differences between the average brightness values in each sub-frame of the first and second images to obtain the position of the aiming light spot based on the largest difference between the average brightness values in at least one of the sub-frames.

13. The method of claim 10, wherein the capturing is performed by one of a near imager for imaging close-in targets over a relatively wider imaging field of view, and a far imager for imaging far-out targets over a relatively narrower imaging field of view, and wherein one of the imagers has a variable focus.

14. The method of claim 13, wherein the adjusting is performed by adjusting the focus of the one imager based on the determined target distance.

15. The method of claim 13, wherein the adjusting is performed by selecting one of the imagers, and by adjusting at least one of a gain and an exposure for the selected imager, based on the determined target distance.

16. The method of claim 13, and illuminating the target with a variable level of illumination light, and wherein the adjusting is performed by adjusting the level of the illumination light based on the determined target distance.

* * * * *